Oct. 6, 1936.　　　W. E. CROSS　　　2,056,601
LAWN TOOL
Filed Dec. 9, 1935　　　2 Sheets-Sheet 2
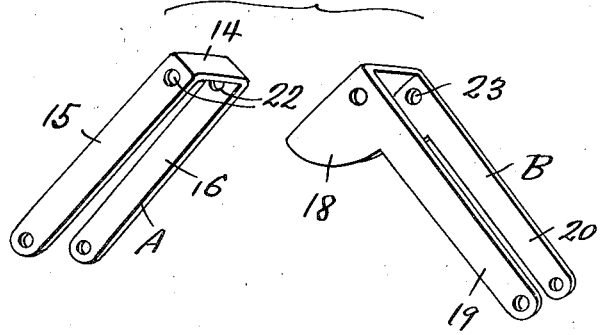
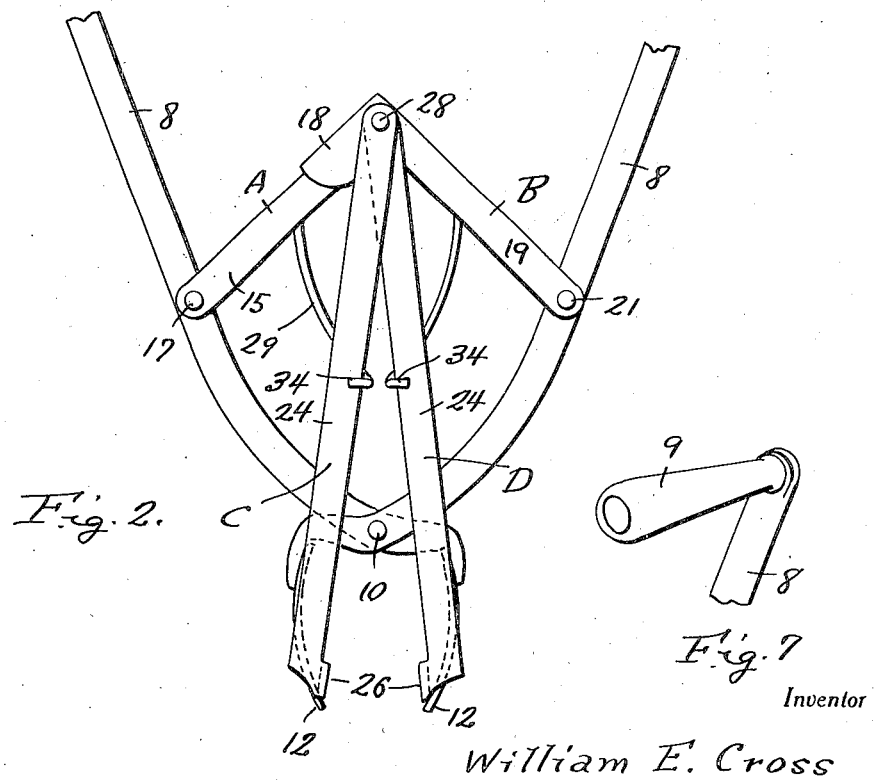
Inventor
William E. Cross
By Clarence A. O'Brien and Hyman Berman, Attorneys Patented Oct. 6, 1936

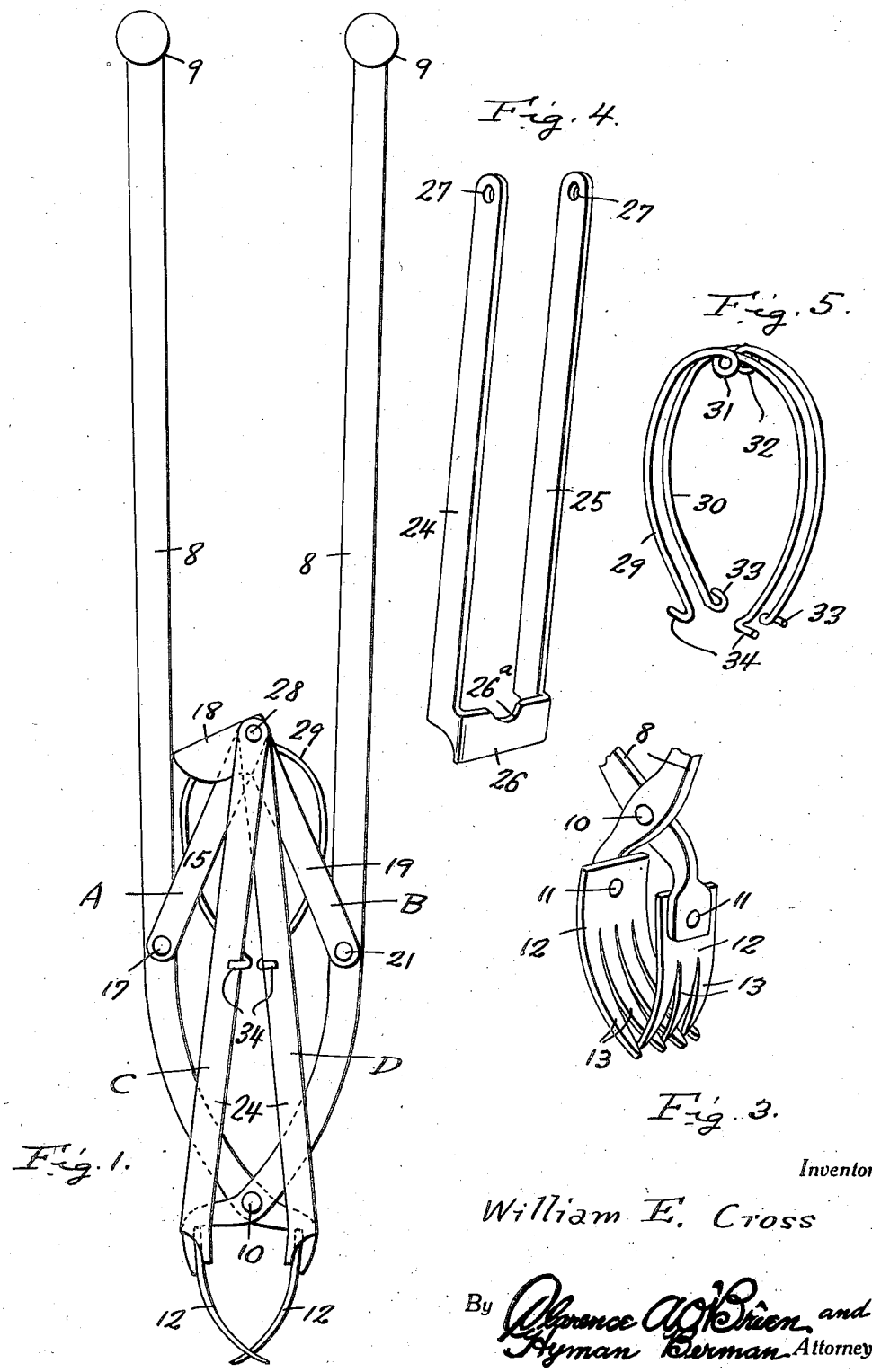

2,056,601

UNITED STATES PATENT OFFICE 2,056,601

LAWN TOOL

William E. Cross, Blandville, W. Va.

Application December 9, 1935, Serial No. 53,640

3 Claims. (Cl. 55—68)

This invention relates to lawn tools. The primary object of the present invention is to provide a tool with earth piercing jaws carried on the ends of handles that enable a person to remove weeds from the lawn while standing in upright posture.

Another feature of the present invention is to provide an ejector to remove the weed extracted by the lawn tool from the jaws after the weed has been removed from the lawn.

Further objects of the invention are to provide a device of the character referred to that is strong, compact and durable, having very few operating parts, and that is comparatively inexpensive to manufacture.

With the foregoing and other objects in view the invention consists of a novel construction combination and arrangement of parts as will be hereinafter more specifically described and illustrated in the accompanying drawings wherein is disclosed an embodiment of the invention, but it is to be understood that changes, variations, and modifications may be resorted to without departing from the spirit of the claims thereunto appended.

In the drawings wherein like reference characters denote corresponding parts throughout the several views:—

Figure 1 is a side elevation of the device in accordance with the present invention showing the relation of the parts when the jaws are closed in weed extracting position.

Figure 2 is a fragmentary side elevation similar to Figure 1 showing the relation of the parts when the jaws are open and the ejector at the end of its downward stroke.

Figure 3 is a fragmentary perspective view of the jaws.

Figure 4 is a perspective view of one of the ejector arms.

Figure 5 is a perspective view of the companion springs as they are arranged in operative position on the device.

Figure 6 is an exploded view of the operating links.

Figure 7 is an enlarged perspective view of the upper end of one of the operating handles.

Referring to the drawings in detail 8—8 indicate a pair of elongated operating handles having lateral operating hand grips 9 rotatably connected with their upper ends. The lower portion of the handles 8—8 curve inwardly and cross and where they cross the handles are pivoted at 10. The handles 8—8 terminate below the pivot and secured by means of rivets 11 thereto are the upper ends of the inwardly curving jaws 12—12. Each jaw 12 is formed with spaced tines 13—13 and in the closed position the tines of one jaw fit tightly between the tines of the companion jaw. The jaws 12—12 are formed of flat bars and the tines taper outwardly and upwardly from the sharp points thereof.

A pair of operating links A, B span the space between the handles and are located above the pivot 10. The link A is formed of a U-shaped bar disposed for rocking movement in a diagonal direction with the crown 14 thereof directed inwardly. The legs 15, 16 straddle one handle 8 and the free ends of the legs are rockable on a pivot 17 having an intermediate portion anchored to the handle. The companion operating link B has a laterally extending crown 18 and is likewise of U-shaped configuration with the crown disposed inwardly. The laterally extending crown 18 overlaps the outer portion of the legs on the companion operating link A and limits the spread of the handles. The legs 19, 20 on the companion operating link B straddles the lower portion of the other handle 8. The free ends of the legs 19, 20 rock on a pivot 21 on the other handle 8. The pivots 17 and 21 lie in the same horizontal plane. The width between the legs 15, 16 on the one operating link is such that they fit inside the legs 19, 20 on the companion operating link. Adjacent the crown 14 the one operating link A has registering openings 22 in the respective legs and these openings register with corresponding openings 23 on the legs of the companion link B in the assembled relation.

There is one ejector member C for one jaw and another ejector member D for the other jaw. Each ejector member is formed in the same manner and referring particularly to Figure 4 it is believed that a description of the one will clearly teach the construction of the other. The ejector member is formed with a U-shaped bar and has flat edge-wise disposed spaced legs 24, 25, which merge at their lower end in a crosswise disposed crown or wiping blade 26. The blade 26 is flat and has a free lower edge in wiping engagement with the tines 13. On the upper edge of the wiping blade is a recess 26a to clear the handles 8.

The ejecting members C and D are disposed in an upright relation at an angle to each other with the blades 26 on their lower ends bearing against the inner face of the jaws against the tines 13. The legs of each ejector member straddle the side edges of the jaws and the legs have a sliding engagement therewith. The legs 24, 25 of the ejector members straddle the crossed ends of the handles and extend upwardly. The free upper ends of the legs 24, 25 of the ejector member C overlap the upper ends of the corresponding legs on the ejector member D. On the free ends of the legs 24, 25 of each ejector member are round openings 27 which register with the corresponding openings 22, 23 of the operating links. There is one pivot 28 which connects the links A, B and the upper end of the legs of the ejector members C and D thereby providing a structure that utilizes a common pivot for the operating links and the ejector members. The upper ends of the legs of the ejector members C, D straddle the member B.

In order to hold the wiping blade under tension against the inside of the jaws 12—12 there is mounted a pair of bowed springs 29, 30 between the legs 15, 16 on the operating link A and for this purpose each of the springs has an integral loop or eye 31, 32 in the crown thereof. The intermediate portion of the shank of the pivot 28 extends through these loops 31, 32 and springs are free to rock thereon. Spring 30 is formed with hooks 33 on the ends of the legs which overlap and grip confronting edges of corresponding legs 25—25 on one side of the ejector members C, D. There are like hooks 34 on the ends of the legs of the bowed spring 29 which overlap and grip confronting edges of the corresponding legs 24, 24 on the ejector members C, D. It will thus be seen that the springs have their crowns mounted on the pivot 28 and urge the ejector member outwardly away from each other holding the wiping blades 26 against the tines and ejecting weeds from the jaws as the handles are spread apart. When the handles are urged together the blades ride up the tines 13 to the position shown in Figure 1 of the drawings thereby permitting the jaws to pierce the earth and the overlapping tines to grip the weeds between the jaws.

Having thus described the invention what I claim is:—

1. A lawn tool comprising a pair of crossed handles pivoted adjacent their lower ends, earth piercing jaws carried by the lower ends of the handles, a pair of ejecting members one slidably arranged on each jaw, a pair of operating links disposed between the handles and one being pivoted to each handle above the first mentioned pivot, a movable pivotal connection between the confronting ends of the links and the ejecting members, and a spring member connected at its upper end to the movable pivotal connection and having parts slidable on each ejector member to urge the members into wiping engagement with the jaws.

2. A lawn tool comprising a pair of crossed handles pivoted adjacent their lower ends, earth piercing jaws carried by the lower ends of the handles, a pair of ejecting members one slidably arranged on each jaw, a pair of operating links disposed between the handles and one being pivoted to each handle above the first mentioned pivot and a movable pivotal connection betwen the confronting ends of the links and the ejecting members, and a spring member connected at its upper end to the movable pivotal connection and having parts slidable on each ejector member to urge the members into wiping engagement with the jaws, and means on the links to limit the spread of the handles.

3. A lawn tool comprising a pair of crossed handles pivoted adjacent their lower ends, earth-piercing jaws carried by the lower ends of the handles, a pair of ejecting members one slidably arranged on each jaw, said ejector members being U-shaped and having legs straddling the jaws and the crown forming a blade having wiping engagement with the jaws, a pair of operating links disposed between the handles and one being pivoted to each handle above the first-mentioned pivot, and a movable pivotal connection between the confronting ends of the links and the pairs of legs on the ejecting members.

WILLIAM E. CROSS.